United States Patent [19]

Williams

[11] 4,289,116
[45] Sep. 15, 1981

[54] SOLAR HEATING SYSTEM FOR A GREENHOUSE OR OTHER BUILDING

[75] Inventor: Robert H. Williams, Maggie Valley, N.C.

[73] Assignee: Meadowbrook Resort, Inc., Maggie Valley, N.C.

[21] Appl. No.: 85,380

[22] Filed: Oct. 16, 1979

[51] Int. Cl.³ .......................... F24J 3/02; A01G 9/00
[52] U.S. Cl. .................................. 126/431; 126/436; 126/437; 126/449; 47/17
[58] Field of Search ............... 126/430, 450, 429, 436, 126/437, 449; 47/17

[56] References Cited

U.S. PATENT DOCUMENTS

| | | | |
|---|---|---|---|
| 3,236,294 | 11/1961 | Thomason | 126/430 |
| 3,369,541 | 2/1968 | Thomason | 126/400 |
| 3,991,938 | 11/1976 | Ramey | 126/432 |
| 3,994,278 | 11/1976 | Pittinger | 126/271 |
| 4,010,731 | 3/1977 | Harrison | 126/430 |
| 4,027,437 | 6/1977 | Monsky | 126/431 |
| 4,029,258 | 6/1977 | Groth | 126/430 |
| 4,055,163 | 11/1977 | Costello | 126/450 |
| 4,063,547 | 12/1977 | Gruettner | 126/271 |
| 4,069,593 | 1/1978 | Huang | 126/271 |
| 4,076,076 | 2/1978 | Harrison | 126/271 |
| 4,102,327 | 7/1978 | Thomason | 126/430 |
| 4,103,825 | 8/1978 | Zornig | 126/400 |
| 4,106,482 | 8/1978 | Savage et al. | 126/271 |
| 4,108,373 | 8/1978 | Chiapale et al. | 126/429 |
| 4,139,055 | 2/1979 | Thomason et al. | |
| 4,141,498 | 2/1979 | Marschner | 47/17 |
| 4,144,875 | 3/1979 | Bruno et al. | 126/449 |
| 4,173,212 | 11/1979 | Whitcomb | 47/17 |

FOREIGN PATENT DOCUMENTS 2309679 10/1974 France ................. 126/429

Primary Examiner—Samuel Scott
Assistant Examiner—G. Anderson
Attorney, Agent, or Firm—Bell, Seltzer, Park & Gibson

[57] ABSTRACT

The present invention provides a solar heating system which is particularly suited for use in a building, such as a greenhouse, having walls defining an enclosed interior with at least one of the walls including a light transmissive area for admitting light into the interior of the building. In accordance with the invention a solar heat collector is positioned underlying the light transmissive area of the building wall, with the collector comprising a plurality of elongate radiation absorptive heat conductive elements for receiving solar radiation and being heated thereby. The heat conductive elements extend longitudinally downwardly and are positioned in laterally spaced relation from one another for admitting light therebetween into the building while also serving for partially shading the interior of the building. A stream of heat transfer liquid is directed downwardly in contact with the heat conductive elements for transferring heat therefrom, and a conduit is provided for receiving the heated liquid as it flows from the heat conductive elements and for directing the heating liquid to a predetermined location to permit utilization of the heat content thereof.

29 Claims, 5 Drawing Figures

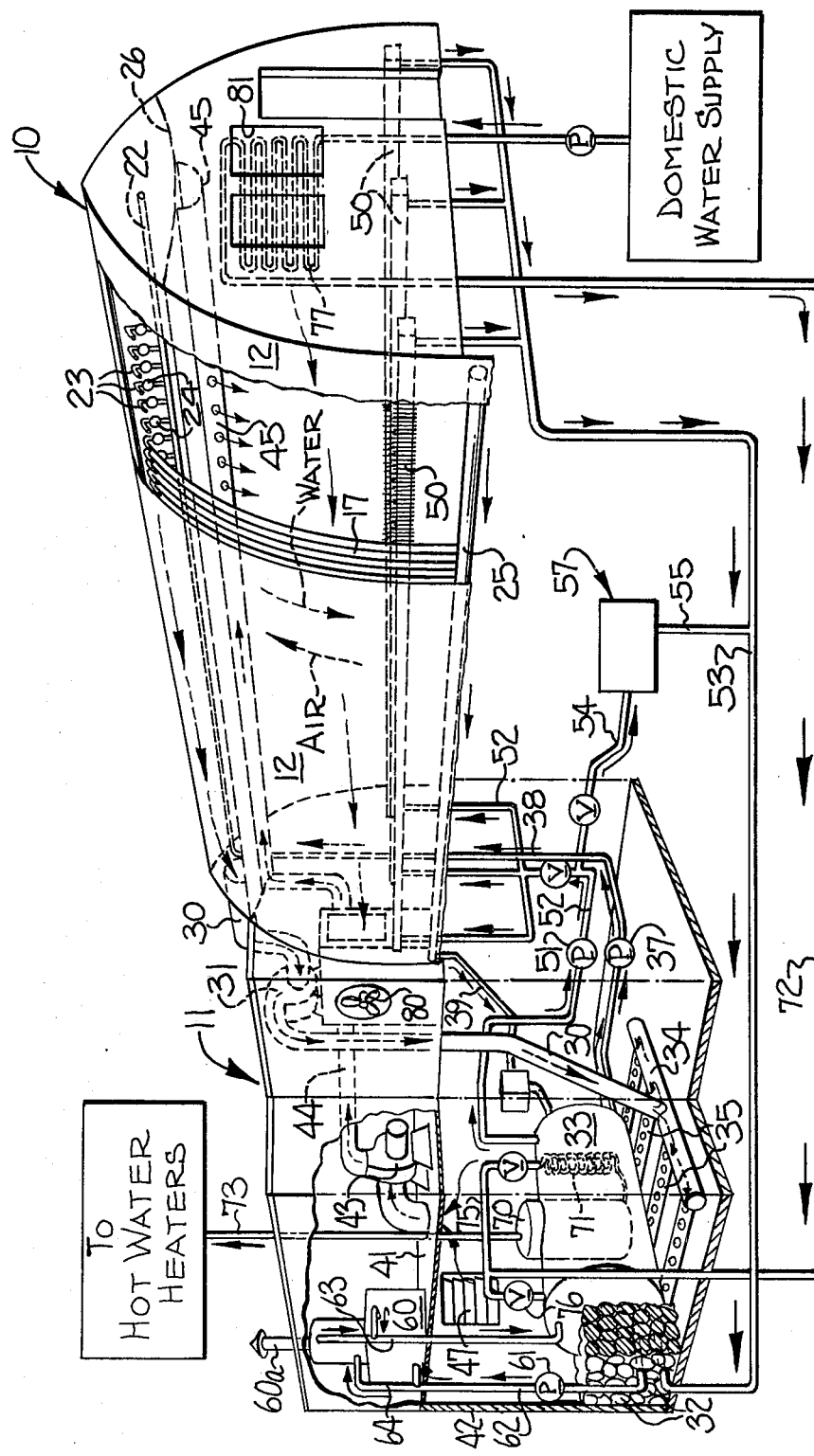

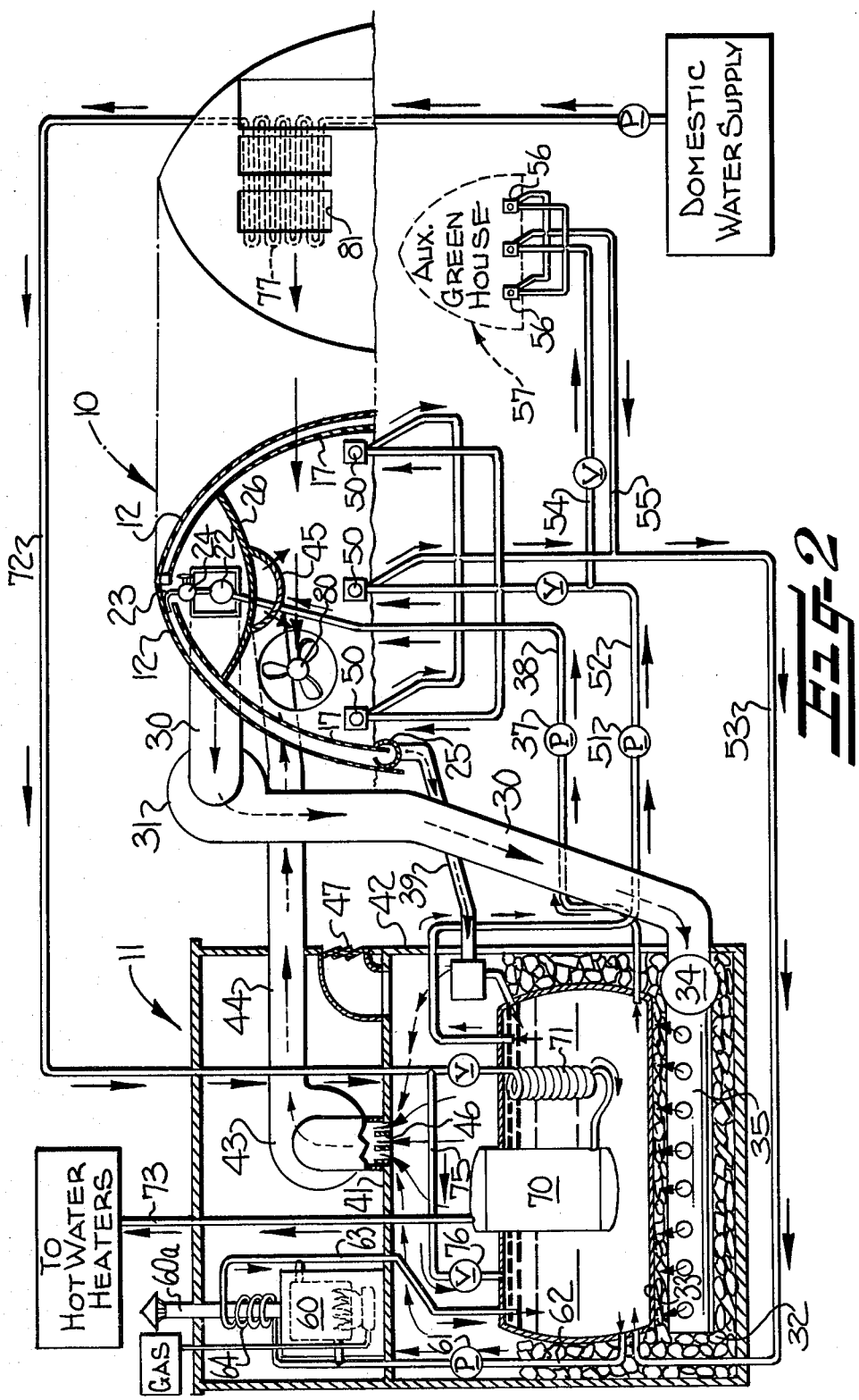

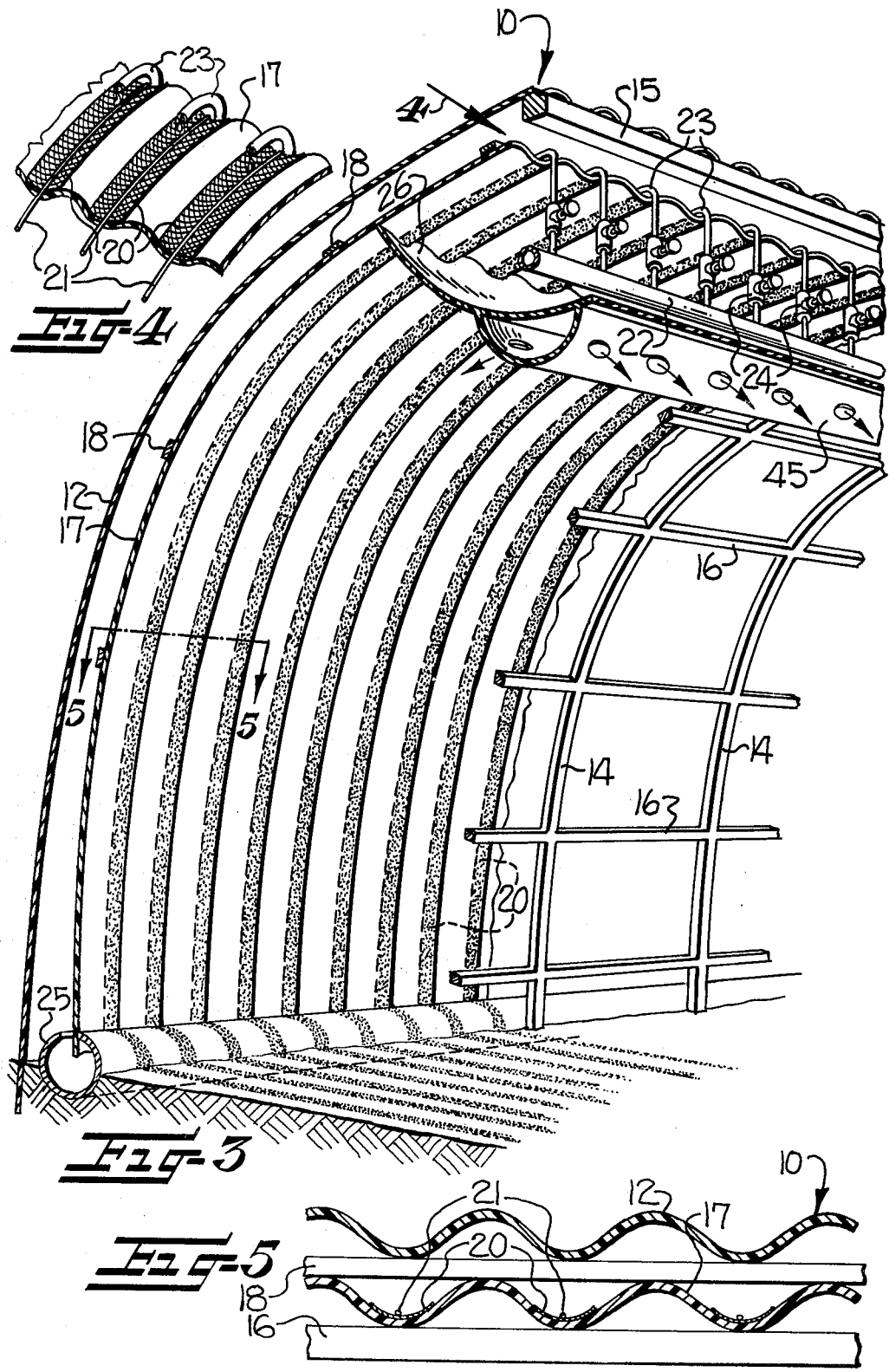

SOLAR HEATING SYSTEM FOR A GREENHOUSE OR OTHER BUILDING

FIELD OF THE INVENTION

This invention relates to a solar heating system for a building, such as a greenhouse, and in particular to an improved apparatus and method for use in such a building for collecting heat from the radiant energy of the sun.

BACKGROUND OF THE INVENTION

During periods of full and intense sun, a greenhouse is naturally heated by the sun's energy and there is very little, if any, need for auxiliary heating. However, at night or during periods of cold, cloudy weather a greenhouse loses its heat quite rapidly and some form of auxiliary heating is therefore required in order to maintain the temperature in the greenhouse at an acceptable level. The soaring cost of fuel for providing auxiliary heating in a greenhouse, and the inability to obtain adequate fuel supplies, has had a severe impact on commercial greenhouse operators, and indeed, has driven a number of greenhouse operators out of business.

The desirability of utilizing solar energy for the heating of homes and other buildings has long been recognized and a number of proposals have been made for applying solar heating technology for the heating of greenhouses. However, the previously proposed or constructed solar heated greenhouses of which applicant is aware have certain limitations or disadvantageous which render them impractical or infeasible for application to a commercial scale greenhouse.

For example, proposals have been made to provide conventional solar panels adjacent to a greenhouse for collecting solar heat energy to use for heating the greenhouse at night or during cloudy weather. However, because of the expanse of glass and the high heat loss factor of a greenhouse, this type of solar heated greenhouse would require a large number of solar panels and take up a considerable amount of space. The cost and space requirements of such an arrangement is prohibitive.

There have also been proposed a number of designs for a solar heated greenhouse, as for example in recent U.S. Pat. Nos. 4,108,373 and 4,141,498. However, these designs are of an unconventional or exotic construction whih are impractical and economically infeasible for application to a commercial scale greenhouse.

SUMMARY OF THE INVENTION

The present invention provides a solar heating system which is practical and economically feasible to apply to a commercial scale greenhouse or other building structure.

A particularly advantageous feature of the solar heating system of this invention is that it is equally suited for installation in a newly constructed greenhouse or in a previously existing greenhouse, and unlike many of the previously proposed solar heated greenhouses which are of exotic or unconventional construction, the solar heating system of this invention is applicable to a conventional type of greenhouse construction.

One of the features of this invention which makes it so economically practical for installation in a greenhouse is that it utilizes a part of the existing greenhouse structure in the construction of the solar heat collector. The solar collector is incorporated in and supported by a light transmissive wall of the building structure and is constructed so as to allow light to pass through the collector into the building while also serving for partially shading the interior of the building from the direct rays of the sun.

The solar heating system of this invention is thus uniquely suited for a greenhouse having a large expanse of light transmissive wall area, but may also be advantageously utilized in other building structures having areas which allow light into the building, such as windows, skylights, and the like.

The present invention is utilized in a building having walls defining an enclosed interior with at least one of the walls including a light transmissive area for admitting light into the interior of the building, and employs a solar heat collector of unique construction positioned underlying a light transmissive area of the wall of the building. The collector comprises a plurality of elongate, radiation absorptive, heat conductive elements for receiving solar radiation and being heated thereby. The heat conductive elements extend longitudinally downwardly and are positioned in laterally spaced relation from one another for admitting light therebetween into the building while also serving for partially shading the interior of the building. Means are provided cooperating with the heat conductive elements for directing a stream of heat transfer liquid downwardly in contact with the elements for transferring heat therefrom, and conduit means is provided for receiving the heated liquid as it flows from the heat conductive elements and directing the liquid to a predetermined location to permit utilization of the heat content.

Preferably, the solar heat collector includes a light transmissive inner wall which is positioned underlying the light transmissive wall of the building, and the elongate radiation absorptive heat conductive elements are carried by the light transmissive inner wall. The light transmissive inner wall is preferably of a corrugated construction having laterally spaced longitudinal corrugations therein forming spaced troughs extending longitudinally downwardly at an incline. The elongate heat conductive elements preferably comprise elongate strips of radiation absorptive heat conductive material, such as blackened copper strips, for example, which are disposed in selected troughs of the corrugated inner wall so as to be exposed to the flow of heat transfer liquid therealong. The heated liquid is stored in a storage tank or reservoir for later use when additional heat is needed in the building. The heated liquid is then circulated from the reservoir through the building for thus supplying needed heat to the building.

When the solar heating system of the present invention is used in a greenhouse, the greenhouse is preferably of the type comprising a pair of arched light transmissive walls connected together along the upper end thereof and forming the top and sides of the greenhouse. A horizontal wall is preferably provided in the upper portion of the interior of the greenhouse extending between and interconnecting the pair of arched walls and forming a ceiling for the greenhouse and a hot air chamber or plenum in the upper portion of the greenhouse. Air heated by the sun's energy and trapped in this hot air plenum may be withdrawn from the hot air plenum by a fan and directed to a heat storage reservoir where the heat content thereof may be stored for later use when needed for heating the greenhouse. When additional heating is needed, heated air may be withdrawn from the storage reservoir and directed into the greenhouse.

The light transmissive corrugated inner wall which forms a part of the collector is spaced inwardly from the outer transparent wall of the building or greenhouse to define an air space therebetween. As the radiation absorptive heat conductive strips are heated by the sun's energy, the air trapped in the air space between the outer and inner walls is also heated. This heated air rises and is discharged at the upper end of the collector into the hot air plenum, thus providing an additional supply of heated air in the hot air plenum for being directed to the heat storage reservoir.

It will thus be seen that the solar heating system of the present invention effectively utilizes, in combination, several different methods or principles of solar heating, including passive solar heating, circulated hot air, and circulated heated liquid. The efficiency of the solar heat collecting system is such that the solar heating system is capable of supplying heat not only for the greenhouse or other building in which the solar collector is installed, but for other additional buildings as well. The detailed disclosure which follows describes how the solar heating system of this invention can be utilized for heating one or more auxiliary buildings, as well as for preheating the domestic water being supplied to a water heater.

BRIEF DESCRIPTION OF THE DRAWINGS

Some of the objects, features and advantages of the invention having been stated, others will become apparent as the description proceeds, when taken in connection with the accompanying drawings in which—

FIG. 1 is a schematic perspective view illustrating the solar heating system of this invention as applied to a greenhouse;

FIG. 2 is a further schematic view of the solar heating system of FIG. 1;

FIG. 3 is a fragmentary perspective view of the interior of the greenhouse, showing the solar heat collector;

FIG. 4 is a detailed perspective view of the solar heat collector as viewed from the arrow 4 in FIG. 3; and FIG. 5 is a transverse cross-sectional view of the greenhouse and solar heat collector, taken substantially along the line 5—5 of FIG. 3.

DESCRIPTION OF THE ILLUSTRATED EMBODIMENT

The description which follows shows how the solar heating system of this invention may be utilized for heating a commercial greenhouse. However, from this description it should become evident to those skilled in the art how the solar heating system may be advantageously utilized in other building structures having areas, such as windows, skylights, etc. which allow light into the building.

Referring now more particularly to the drawings, a solar heated greenhouse constructed in accordance with the present invention is indicated generally in the drawings by the reference character 10. Adjoining the greenhouse 10 at one end thereof is a storage and control building, indicated generally by the reference character 11. The greenhouse 10 is of an elongate arched construction and includes a pair of arched outer walls 12 which are joined to one another along the top of the greenhouse and form the top and sides of the greenhouse. The walls 12 are supported by an underlying skeletal supporting frame formed of wood or other suitable material.

As best seen in FIG. 3, the skeletal supporting frame includes a series of spaced arched upright members 14 which extend upwardly from the base of the greenhouse and are connected to a ridge board 15 extending along the top of the greenhouse. Cross members 16 extend longitudinally of the greenhouse and are connected to the upright members 14. As illustrated, the greenhouse is of a double wall construction including outer walls 12 and inner walls 17. The outer walls 12 extend generally upwardly and meet at the ridge board 15. The inner walls 17 are spaced inwardly from the outer walls and extend in generally parallel spaced relation thereto. As shown in FIG. 5, the inner surface of the inner wall 17 is supported by the cross member 16 of the skeletal supporting frame. Spacer members 18 extend transversely across the outer surface of the inner wall 17, with the outer wall 12 of the greenhouse being supported by and connected to the spacer members 18. The spacer members thus serve to maintain the outer and inner walls 12, 17 in parallel spaced relation from one another throughout the entire extent of the greenhouse.

Both the outer and inner walls 12, 17 are formed of a light transmissive (i.e. transparent or translucent) material to allow sunlight to enter the greenhouse. In the embodiment of the invention illustrated herein, the inner wall 17 comprises a corrugated glass reinforced plastic sheet material, with the corrugations therein forming longitudinally extending peaks and troughs for purposes which will become apparent as the description proceeds. Preferably, and as illustrated the outer wall 12 is formed of a similar kind of corrugated material.

In accordance with the present invention the inner wall 17 is utilized as a solar collector for collecting the radiant heat energy from the sun. To this end, elongate strips 20 of an opaque radiation absorptive heat conductive material are positioned in the respective troughs of the corrugated inner wall 17 and held in place by a wire 21. The strips 20 are preferably formed of a thin sheet of waffle textured copper, the surface of which has been blackened by plating or other suitable methods for thus being heated by the sun's radiant energy. Extending along the upper portion of the greenhouse is a water manifold 22, from which extends a series of individual tubes 23. As seen in FIG. 4, the tubes 23 direct a stream of water or other suitable heat transfer liquid into the respective troughs of the inner wall 17, where the water flows downwardly over the heated strips 20 to receive the heat therefrom. Valves 24 are provided in each respective tube 23 to permit controlng and varying the rate of flow of the water along the respective troughs to achieve a uniform distribution of water throughout the length of the greenhouse. A pipe 25 located at the base of the greenhouse wall is provided with a longitudinal slit or opening in the upper side thereof and the lowermost end of the inner corrugated wall 17 extends into the pipe 25 through the slit provided therein. The pipe 25 thus serves for receiving and collecting the solar heated water as it flows from the lower end of the corrugated wall 17.

As best seen in FIG. 5, the elongate heat conductive strips 20 are of a concave curved cross-sectional configuration. This configuration serves to assist in channeling and retaining the downwardly flowing water over and along the strips 20 so as to effectively transfer heat from the strips to the water. The concave curved configuration of the strips is also highly significant in that it insures that some portion of the width of the strip is always oriented directly toward the sun regardless of the position of the sun. By way of example, it will be appreciated that if the elongate strips are facing south (in the northern hemisphere) then the curved configuration of the strips will cause a portion of the width of of each strip to be oriented generally easterly so as to be directly exposed to the early morning sun, while the opposite longitudinal portion of the strip is oriented so as to be directly exposed to the late afternoon sun. Thus, the concave curved configuration of the strips maximizes the exposure to the sun so that the strips are effectively heated by the early morning and late afternoon sun as well as the midday sun.

The arched structure of the greenhouse and the resulting arched convex curvature of the strips 20 along their length also serves to assist in maximizing the exposure of the strips to the sun. The arched or convex curved configuration of the strips 20 assists in compensating for seasonal variations of the angle of the sun by insuring that at least a portion of the strip is directly oriented toward the sun. Thus, the concave curved configuration of the strips 20 in combination with the arched structure of the greenhouse and the resulting convex curvature of the strips along their length serve to insure that some portion of the surface of the strips 20 will always be oriented directly facing the sun no matter what the season of the year or time of day.

The arched or convex curved configuration of the strips 20 along their length also serves to convey the water or other heat transfer liquid downwardly along the strips relatively slowly at first in the upper portions of the collector which are exposed most directly to the sun, and then at an increasing velocity along the lower portions of the collector which form the side walls of the greenhouse.

It will thus be seen that this arrangement permits the entire wall of the greenhouse to be utilized as a solar collector. Depending upon the orientation of the greenhouse with respect to the sun, either one or both sides of the greenhouse can be provided with this type of solar collector arrangement. Thus, where one side of the greenhouse has a southerly exposure as in the illustrated embodiment, only one side of the greenhouse will be utilized as a solar collector and the strips 20 will be installed in only that side of the greenhouse. However, the double wall construction is preferably used on both sides of the greenhouse because of the improved insulating properties achieved thereby.

In addition to serving as a heat collector when exposed to the sun, the spaced series of elongate strips 20 also serve for partially shading the interior of the greenhouse from the direct rays of the sun. As shown in FIG. 3, the opaque strips cast a series of spaced striplike shadows in the interior of the greenhouse in a manner similar to that which would be provided by a trellis. Thus, this avoids the necessity of providing a protective trellis or protective shade cloth inside the greenhouse as is often necessary in order to protect the plants from the intense direct rays of the sun.

As best seen in FIGS. 2 and 5, a wall 26 is provided in the upper portion of the interior of the greenhouse extending between and interconnecting the pair of arched light transmissive walls which form the greenhouse. This wall 26 serves to form a ceiling for the greenhouse while also forming an enclosed area in the uppermost portion of the greenhouse which serves as a hot air chamber or hot air plenum, for purposes to be explained more fully hereinafter. As illustrated, the wall 26 is formed of a plastic film material and preferably is provided with a black surface on the upper side thereof and with a white surface on the underside thereof. The black upper surface is adapted to be heated by the sun passing through the upper portion of the light transmissive walls of the greenhouse to assist in heating the air which is trapped in the hot air plenum. The white underside of the wall 26 provides a reflective surface to redirect reflected light onto the plants located within the interior of the greenhouse. Thus, during periods of full and intense sunlight, the natural tendency of hot air to rise, together with the additional heating provided by the blackened surface of the wall 26 results in the air within the hot air plenum being considerably warmer than the air in the lower portions of the greenhouse, just as the attic of a conventional building is normally considerably warmer than the lower portions of the building. The heating of the air in the hot air plenum is assisted by the double wall construction of the greenhouse. Specifically, an air space is defined between the outer wall 12 and the inner wall 17 of the greenhouse. The air which is trapped between these walls is heated by the sun and the heated strips 20, and upon being heated flows upwardly by convection and is discharged into the hot air plenum, thus further contributing to the heating of the air in the hot air plenum.

Heated air is withdrawn from the hot air plenum via a duct 30 and blower 31 and is directed to a hot air storage reservoir located in the storage and control building 11. The hot air storage reservoir, more particularly, comprises a bed of rocks 32 which is located in a pit beneath the storage and control building 11 surrounding a large tank 33. A manifold duct 34 directs the heated air from the supply duct 30 to a series of perforated pipes 35 buried at the bottom of the bed of rocks 32 which serve to distribute and discharge the heated air throughout the bed of rocks. The tank 33 which is surrounded by the bed of rocks 32 serves as a storage reservoir for the heated water, and the surrounding bed of rocks 32 serves to assist in heating the water within the tank and maintaining the water in a heated condition.

During periods of sunlight, water is withdrawn from the lower portion of the tank 33 and is pumped by a pump 37 along a line 38 to the manifold 22 where the water is directed downwardly along the troughs in the inner wall 17. The solar heated water which is collected in the pipe 25 flows by gravity along a line 39 and is discharged into the upper end of the tank 33. At the same time, the blower 31 is operated so as to direct the heated air from the hot air plenum along the duct system 30, 34, 35 and into the bed of rocks 32.

As best seen in FIGS. 1 and 2, the storage and control building 11 includes a floor 41 and walls 42 which serve to enclose the area where the bed of rocks 32 and storage tank 33 are located. A blower 43 located in the control room of the storage and control building 11 has its inlet side communicatively connected to the underlying enclosed area through a hole provided in the floor 41. A duct 44 is connected to the outlet side of the blower 43 for supplying air to an elongate perforated air distribution duct 45 extending along the length of the greenhouse underlying the ceiling wall 26. When heating is required in the greenhouse, the blower 43 is operated so as to draw heated air from the bed of rocks 32 and supply the heated air into the greenhouse via the air distribution duct 45. During periods when heating is not required in the greenhouse, such as during the summertime for example, the heated air from the bed of rocks is vented to the outside instead of being recirculated into the greenhouse. This is accomplished by a set of louvers 46 provided on the inlet side of the fan 43 and a second set of louvers 47 provided in the wall 42 of the storage and control building. As illustrated in FIG. 2, the louvers 46 are open and the exhaust louvers 47 are closed so that the heated air from the bed of rocks is recirculated into the greenhouse. When the heated air from the bed of rocks is not needed for heating the greenhouse, the louvers 46 are closed and the louvers 47 are opened so that the air, after passing through the bed of rocks 32 is exhausted to the outdoors.

The greenhouse 10 may also be heated, if desired, by the heated water from storage tank 33. As illustrated, finned tube radiators 50 are provided inside the greenhouse extending longitudinally of the length thereof. Heated water is drawn from the upper portion of the storage tank 33 by a pump 51, and is circulated through the finned tube radiators via a supply line 52 and a return line 53. Under normal conditions, the solar collector system of the present invention is capable of supplying enough heated water for heating other buildings in addition to the greenhouse 10, such as additional greenhouse buildings, for example. Thus, as illustrated in FIG. 2 a supply line 54 and return line 55 are provided for circulating the heated water through finned tube radiators 56 provided in an additional greenhouse building, generally indicated at 57.

As earlier noted, the solar collector arrangement of this invention is generally capable of supplying sufficient heat for heating the greenhouse building 10 as well as one or more additional buildings by collecting and storing the heat during periods of sunlight and utilizing the stored heat at nighttime or other times when additional heat is needed. However, it is desirable to also provide a source of auxiliary heating in the event of an extended period of cloudy or unseasonably cold weather. Thus, a boiler 60 is provided in the storage and control building 11 as an auxiliary means for heating the water in the storage tank 33. When the temperature of the water in the storage tank 33 falls below a predetermined desired level, the boiler 60 may be fired and a pump 61 actuated for pumping water from the storage tank 33 along a line 62, through the boiler 60, and returning to the storage tank via a line 63. As illustrated, the boiler 60 is a conventional gas fired hot water boiler. However, in order to increase the boiler efficiency and minimize fuel costs, the boiler 60 has been modified by mounting a waste heat recovery system on the flue thereof to recover waste heat which would otherwise be discharged with the flue gases. Specifically, a line 64 branches from the supply line 62 and is wrapped around the flue pipe 60a in heat transferring relation thereto with the other end of the line 64 being connected to the return line 63. Thus, when the pump 61 is actuated, some of the water circulates through the line 64 and is heated by the otherwise wasted heat passing out of the flue pipe 60a.

The solar heating system of this invention is also utilized for preheating the domestic hot water which is utilized in the greenhouse or other nearby buildings. As illustrated, a domestic water storage tank 70 is mounted inside the heated water storage tank 33 so that the domestic water within the storage tank 70 is heated by the heated water in the surrounding tank 33. The inlet side of the domestic water storage tank 70 is connected to a coil 71 which is immersed in the heated water within the storage tank 33. Water from a domestic water supply is directed along a supply pipe 72 to the coil 71 and thence to the water storage tank 70. Thus, as the water passes through the coil 71 on its way to the storage tank 70, it is preheated by the heat of the surrounding water within the storage tank 33. Preheated water from the storage tank 70 is supplied as needed along a line 73 to hot water heaters located elsewhere.

A make-up water line 75 branches from the supply line 72 to tank 33 for supplying such additional water as may be needed to compensate for evaporation losses and the like and to keep tank 33 filled. Make-up water may be controllably admitted to the tank 33 by a suitable float valve 76.

During the summer months, the greenhouse building is ventilated by an exhaust fan 80 located at one end of the building, with fresh air inlet openings 81 located at the opposite end thereof. In accordance with a further feature of this invention, the relatively cool domestic water can be utilized to assist in cooling the ventilating air which enters the greenhouse and the domestic water can simultaneously be tempered prior to entering the preheating coil 71. More particularly, as illustrated in FIGS. 2 and 3, a coil 77 is mounted adjacent to the fresh air inlet openings 81 in the path of the fresh air which enters the greenhouse. Water from the domestic water supply is directed through the coil 77 and thence to a supply pipe 72. Thus with the exhaust fan 80 operating, ambient outside air is drawn over the coil 77 and is cooled by the relatively cool domestic water circulating through the coil. At the same time, the domestic water circulating through the coil 77 is preheated or tempered as it passes through the coil on its way to the preheating coil 71.

If desired, the supply pipe 72 may be routed through the hot air plenum in the upper portion of the greenhouse and/or through the interior portion of the greenhouse so that the water in the supply pipe 72 is further preheated by the ambient temperature of the air in the hot air plenum and/or greenhouse.

In the drawings and specification, there has been set forth a preferred embodiment of the invention and although specific terms are employed they are used in a generic and descriptive sense only and not for purposes of limitation.

That which is claimed is:

1. In a building having walls defining an enclosed interior, at least one of said walls including a light transmissive area for admitting light into the interior of the building, the combination therewith of a solar heat collector positioned at a light transmissive area of said wall, said collector comprising a plurality of elongate narrow strips of a radiation absorptive, heat conductive material having an outwardly facing surface exposed for receiving solar radiation and being heated thereby, said strips extending longitudinally downwardly and being positioned in laterally spaced relation from one another for admitting light therebetween into the building while also serving for partially shading the interior of the building, means cooperating with the upper end portions of said strips for directing a stream of heat transfer liquid onto said outwardly facing surface of the strips for flowing downwardly therealong in contact with the strips for transferring heat therefrom, and conduit means cooperating with the lower end portions of the strips for receiving the heated liquid as it flows from said heat conductive strips and directing the liquid to a predetermined location to permit utilization of the heat content thereof.

2. The combination as set forth in claim 1 wherein said solar heat collector comprises a light transmissive inner wall positioned underlying said light transmissive wall of said building, and wherein said elongate, radiation absorptive, heat conductive strips are carried by said light transmissive inner wall.

3. The combination as set forth in claim 2 wherein said light transmissive inner wall has laterally spaced, longitudinal corrugations therein forming spaced troughs extending longitudinally downwardly at an incline, and said elongate, radiation absorptive heat conductive strips of radiation absorptive, heat conductive material are disposed in selected troughs of said inner wall and exposed to the flow of heat transfer liquid therealong.

4. The combination as set forth in claim 2 wherein said light transmissive inner wall is of a nonplanar arched configuration and the longitudinal troughs formed therein extend downwardly at an incline of increasing steepness for conveying the heat transfer liquid therealong.

5. The combination as set forth in claim 2 wherein said light transmissive inner wall of said collector extends in generally parallel, spaced relation to said light transmissive wall of said building to define therebetween a passageway for heating the air which is trapped therein, and including duct means cooperating with the upper end of said collector for receiving the heated air from said passageway and directing the heated air to a predetermined location to permit utilization of the heat content thereof.

6. The combination as set forth in claim 5 additionally comprising a heat reservoir for said heat transfer liquid communicatively connected to said conduit means for receiving the heated liquid and storing the heat content thereof, and a heat reservoir for said heated air communicatively connected to said duct means for receiving the heated air therefrom and storing the heat content of the heated air.

7. The combination as set forth in claim 6 wherein said heat reservoir for the heated air is located in heat transferring relationship to said reservoir for the heat transfer liquid for assisting in maintaining the heat transfer liquid in a heated condition.

8. The combination as set forth in claim 1 wherein said elongate radiation absorptive heat conductive strips are of a concave curved configuration to assist in retaining and channeling the flow of heat transfer liquid therealong, the concave curved configuration of the strips also serving to maximize the direct exposure of the strips to the sun regardless of the position of the sun.

9. The combination as set forth in claim 8 wherein said elongate concave strips are also of an arched convex curved configuration along their length to further assist in maximizing the direct exposure of the strips to the sun.

10. In a solar heated building having walls defining an enclosed interior for being heated, at least one of said walls having a light transmissive area for admitting light into the interior of the building, the combination therewith of
 a solar heat collector positioned underlying a light transmissive area of said wall, said collector comprising a light transmissive inner wall extending longitudinally downwardly at an incline in spaced relation to said light transmissive wall of said building, a plurality of elongate narrow strips of a radiation absorptive heat conductive material carried by said light transmissive inner wall for receiving solar radiation and being heated thereby, said strips being positioned in longitudinally extending, downwardly inclined, laterally spaced apart relation from one another for admitting light therebetween into the building while also serving for partially shading the interior of the building, and said strips having a concave curved configuration to assist in retaining and channeling a flow of heat transfer liquid therealong, the concave curved configuration of the strips also serving to maximize the direct exposure of the strips to the sun regardless of the position of the sun during the day, conduit means provided at the upper end of said collector for directing a stream of heat transfer liquid onto the surface of the strips for flowing downwardly therealong in contact with the concave surface of the strips for transferring heat therefrom, and conduit means provided at the lower end of said collector for receiving the heated liquid as it flows from said heat conductive strips.
 a reservoir connected to said conduit means for receiving and storing the heated liquid for subsequent use; and
 means operable when additional heat is needed in said building for circulating the heated liquid from said reservoir through the building for thus supplying heat to the building.

11. In a solar heated building having walls defining an enclosed interior for being heated, at least one of said walls extending longitudinally downwardly at an incline and including a light transmissive area therein, the combination therewith of
 a solar heat collector positioned underlying said light transmissive area and comprising an inner wall extending longitudinally downwardly at an incline in spaced relation to said wall of said building to define therebetween a passageway for heating the air which is trapped therein,
 duct means cooperating with the upper end of said inner wall for receiving the heated air from said passageway,
 a heat reservoir connected to said duct means for receiving and storing the heat content of the heated air,
 said collector including a plurality of elongate radiation absorptive, heat conductive elements carried by said inner wall for receiving solar radiation and being heated thereby and extending longitudinally downwardly at an incline, means provided at the upper end of said collector for directing a stream of heat transfer liquid downwardly into contact with said heat conductive elements for transferring heat therefrom, and conduit means located at the lower end of said collector for receiving the heated liquid as it flows from said heat conductive element,
 a reservoir communicatively connected to said conduit means for receiving and storing the heated liquid therein and located in heat transferring relationship to said heated air reservoir whereby the heat content of the heated air assists in maintaining the heat transfer liquid in a heated condition, and
 means operable when additional heat is needed in the building for circulating the heated liquid from said reservoir through the building for thus supplying heat to the building.

12. A solar heated greenhouse comprising a pair of arched light transmissive walls connected together along the upper end thereof and forming the top and sides of the greenhouse and defining an enclosed interior for being heated, and a solar heat collector positioned underlying at least one of said light transmissive walls of the greenhouse and comprising a plurality of elongate narrow strips of a radiation absorptive, heat conductive material having an outwardly facing surface exposed for receiving solar radiation and being heated thereby, said strips extending longitudinally downwardly and being positioned in laterally spaced relation from one another for admitting light therebetween into the greenhouse while also serving for partially shading the interior of the greenhouse, means cooperating with said strips for directing a stream of heat transfer liquid onto said outwardly facing surface of the strips for flowing downwardly therealong in contact with the strips for transferring heat therefrom, conduit means for receiving the heated liquid as it flows from the heat conductive strips, a reservoir communicatively connected to said conduit means for receiving and storing the heated liquid therein, and means operable when additional heat is needed in the greenhouse for circulating the heated liquid from said reservoir through the greenhouse for thus supplying heat to the greenhouse.

13. A solar heated greenhouse as set forth in claim 12 wherein said solar heat collector comprises a light transmissive inner wall positioned underlying said at least one light transmissive wall of said building, and wherein said elongate, radiation absorptive, heat conductive strips are carried by said light transmissive inner wall.

14. A solar heated greenhouse as set forth in claim 13 wherein said light transmissive inner wall has laterally spaced, longitudinal corrugations therein forming spaced troughs extending longitudinally downwardly at an incline, and said elongate, radiation absorptive, heat conductive strips are disposed in selected troughs of said inner wall and exposed to the flow of heat transfer liquid therealong.

15. A solar heated greenhouse as set forth in claim 14 wherein said light transmissive inner wall of said collector is also arched and the longitudinal troughs formed therein extend downwardly at an incline of increasing steepness for conveying the heat transfer liquid therealong.

16. A solar heated greenhouse as set forth in claim 13 wherein said light transmissive inner wall of said collector is also arched and extends in generally parallel spaced relation to said at least one arched light transmissive wall of said greenhouse to define therebetween a passageway for heating the air which is trapped therein, and including means defining a hot air plenum in the upper portion of said greenhouse cooperating with the upper end of said collector for receiving the heated air from said passageway and duct means connected to said hot air plenum for directing the heated air to a predetermined location to permit utilization of the heat content thereof.

17. A solar heated greenhouse as set forth in claim 16 additionally comprising a heat reservoir for said heated air communicatively connected to said duct means for receiving the heated air therefrom and storing the heat content of the heated air, and wherein said heat reservoir for the heated air is located in heat transferring relationship to said reservoir for the heated liquid for assisting in maintaining the heat transfer liquid in a heated condition.

18. A solar heated greenhouse as set forth in claim 17 wherein said reservoir for the heated liquid comprises a tank for receiving and storing the heated liquid, and said heat reservoir for the heated air comprises a bed of rocks positioned substantially surrounding said tank.

19. A solar heated greenhouse as set forth in claim 18 including a heat exchanger located in said tank, and conduit means for directing water from a domestic water supply source through said heat exchanger and to a domestic water heater for thereby preheating the domestic water which is directed to the water heater.

20. A solar heated greenhouse as set forth in claim 12 including an exhaust fan operable when excessive heat is present in the greenhouse for exhausting air from the interior of the greenhouse and a fresh air inlet for allowing fresh outside air to be drawn into the greenhouse, and including a heat exchanger located in said fresh air inlet and conduit means for directing water from a domestic water supply source through said heat exchanger and to a domestic water heater for thereby cooling the air which enters the greenhouse as it passes over the heat exchanger while also preheating the domestic water which is directed to the water heater.

21. A solar heated greenhouse as set forth in claim 12 including a wall extending generally horizontally between and connecting said pair of arched light transmissive walls and forming a ceiling for the greenhouse while defining an enclosed hot air plenum thereabove in the upper portion of the greenhouse, the upper surface of said horizontally extending wall having a radiation absorptive surface for receiving solar radiation and being heated thereby to thus heat the air in the hot air plenum, and including duct means connected to said hot air plenum for receiving the heated air therefrom and directing the heated air to a predetermined location to permit utilization of the heat content thereof.

22. A solar heated greenhouse as set forth in claim 19 additionally comprising a heat reservoir for said heated air communicatively connected to said duct means for receiving the heated air therefrom and storing the heat content of the heated air, and means operable when additional heat is needed in the greenhouse for circulating heeated air from said heat reservoir through the greenhouse for thus supplying additional heat to the greenhouse.

23. A solar heated greenhouse comprising a pair of arched light transmissive walls connected together along the upper end thereof and forming the top and sides of the greenhouse and defining an enclosed interior for being heated, and a solar heat collector positioned underlying at least one of said light transmissive walls of the greenhouse and comprising an arched light transmissive inner wall extending longitudinally downwardly at an incline in spaced relations to said arched light transmissive wall of the greenhouse to define therebetween a passageway for heating the air which is trapped therein, a wall extending generally horizontally between and connecting said pair of arched light transmissive walls of the greenhouse and forming a ceiling for the greenhouse while defining an enclosed hot air plenum thereabove in the upper portion of the greenhouse, the upper end of said air heating passageway communicating with said hot air plennum for discharging the heated air therefrom into the plenum, a heat reservoir for receiving and storing the heat content of the heated air, and duct means connected to said hot air plenum for receiving the heated air therefrom and directing the heated air to said heat reservoir, said light transmissive inner wall of said collector having laterally spaced longitudinally extending corrugations therein forming spaced troughs extending longitudinally at an incline, respective elongate narrow strips of radiation absorptive, heat conductive material disposed in selected troughs of said corrugated inner wall and positioned in laterally spaced relation from one another, said strips serving for receiving and collecting solar heat radiation while also serving for partially shading the interior of the greenhouse, means provided at the upper end of said light transmissive inner wall for directing a stream of heat transfer liquid into selected troughs of said inner wall for flowing over said heat conductive strips and transferring heat therefrom, conduit means located at the lower end of said light transmissive inner wall for receiving the heated liquid as it flows from said troughs, a reservoir communicatively connected to said conduit means for receiving and storing the heated liquid therein, and means operable when additional heat is needed in the greenhouse for circulating the heated liquid from said reservoir through the greenhouse for thus supplying heat to the greenhouse.

24. A solar heated greenhouse as set forth in claim 23 wherein said heat reservoir for the heat transfer liquid comprises a tank for receiving and storing the heated liquid, and said heat reservoir for the heated air comprises a bed of rocks arranged for being heated by the heated air and positioned substantially surrounding said tank for assisting in maintaining the heat transfer liquid therein in a heated condition.

25. A solar heated greenhouse as set forth in claim 24 additionally comprising means operable when additional heat is needed in the greenhouse for circulating heated air from said heated air reservoir through the greenhouse for thus supplying additional heat to the greenhouse.

26. A solar heat collector adapted for installation in a building and constructed for admitting light therethrough and into the interior of the building, said heat collector comprising inner and outer light transmissive walls, means mounting said inner and outer walls in spaced apart relation extending generally parallel to one another and extending longitudinally downwardly at an incline, a plurality of elongate narrow strips of a radiation absorptive heat conductive material located between said inner and outer light transmissive walls and having an outwardly facing surface exposed for receiving solar radiation and being heated thereby, said strips extending longitudinally downwardly and being positioned in laterally spaced apart relation from one another for admitting light therebetween into the building while also serving for partially shading the interior of the building, conduit means cooperating with the upper ends of said strips for directing a stream of heat transfer fluid onto said outwardly facing surfaces of the strips for flowing downwardly therealong in contact with the strips for transferring heat therefrom, and conduit means cooperating with the lower ends of the respective strips for receiving the heated fluid as it flows therefrom and directing it to a predetermined location to permit utilization of the heat content thereof.

27. A solar heat collector as set forth in claim 26 wherein said elongate, radiation absorptive, heat conductive strips are carried by said light transmissive inner wall.

28. A solar heat collector as set forth in claim 26 wherein said means mounting said inner and outer walls in spaced apart relation cooperates with said walls to define an enclosed passageway between said inner and outer walls for heating the air which is trapped therebetween, and including duct means communicating with said enclosed passageway for receiving the heated air therefrom and directing the heated air to a predetermined location to permit utilization of the heat content thereof.

29. A solar heat collector as set forth in claim 26 wherein said elongate narrow strips have a concave curved cross-sectional configuration to assist in retaining and channeling a flow of heat transfer liquid therealong, the concave curved configuration of the strips also serving to maximize the direct exposure of the strips to the sun regardless of the position of the sun during the day.

* * * * *